April 21, 1931.   H. WARDMAN   1,802,190
ICE CUBE FORMING ASSEMBLY
Filed Oct. 22, 1929
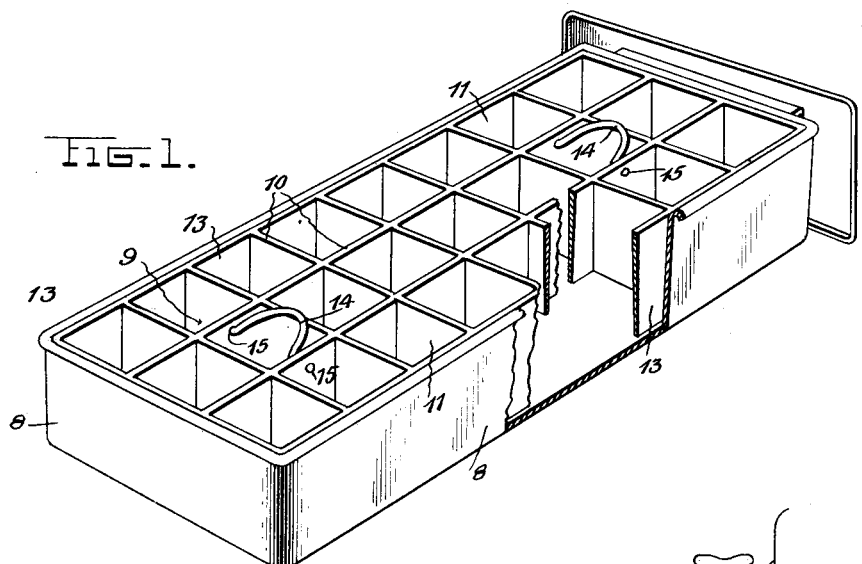
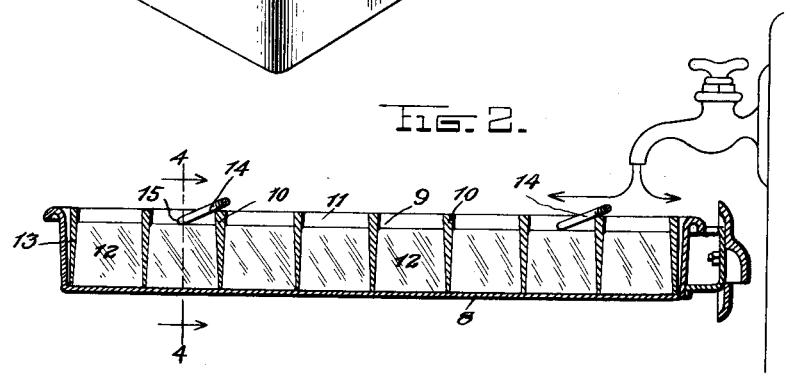
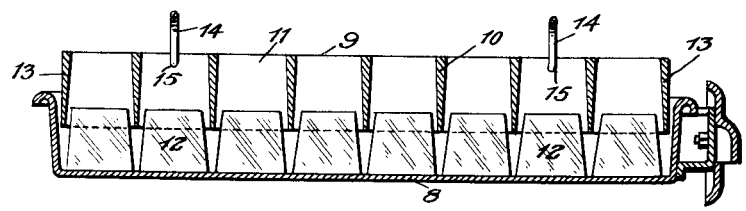
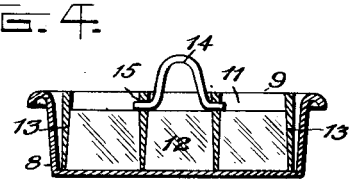
Inventor
Harry Wardman
Witness
Attorneys Patented Apr. 21, 1931

1,802,190

UNITED STATES PATENT OFFICE

HARRY WARDMAN, OF WASHINGTON, DISTRICT OF COLUMBIA

ICE-CUBE-FORMING ASSEMBLY

Application filed October 22, 1929. Serial No. 401,449.

The invention relates generally to refrigerators and has reference more particularly to those embodying one or more shallow pans and a removable frame in each pan, providing cells in which water is frozen to form ice cubes. Heretofore, considerable difficulty has been encountered in removing the cubes of ice, and it is the object of my invention to overcome this difficulty.

With the foregoing in view, the invention resides in the novel subject matter hereinafter described and claimed, description being accomplished by reference to the accompanying drawing.

Figure 1 is a perspective view partly broken away and in section showing a pan and frame assembly improved in accordance with this invention.

Fig. 2 is a longitudinal sectional view showing the pan and its contents under a spigot to loosen the frame from the cubes and pan.

Fig. 3 is a view similar to Fig. 2, but illustrating the frame partly withdrawn from the pan, leaving the ice cubes within the latter.

Fig. 4 is a transverse sectional view on line 4—4 of Fig. 2.

In the drawing above briefly described, the numeral 8 denotes the conventional shallow pan to contain the water from which to form the ice, and 9 indicates a removable frame or grid within said pan embodying partitions 10 defining cells or compartments 11 in which to form ice cubes 12. I improve upon this assembly of pan and frame by providing the partitions 10 with a thickness which gradually increases toward their upper edges. Hence, the cells 11 are of larger size at their lower ends than at their upper ends as shown in a number of the views of the drawing. Preferably, I provide the frame 9 with a continuous side wall 13 secured to the outer ends of the partitions 10 and co-extensive in height therewith, and the inner side of this wall 13 is preferably inclined as shown.

To remove the ice cubes 12, the pan 8 with the contained frame 9 and ice cubes, may be inserted under a spigot as shown in Fig. 2 and water run over said pan, frame and cubes. This loosens the frame 9 from the cubes and the pan 8 and said frame may then be withdrawn as seen in Fig. 3. Suitable handle equipment is provided to aid in lifting the frame 9 from the pan and cubes. In the present showing, two handle-forming bails 14 have their ends pivotally received in openings 15 in certain of the partitions 10. These bails normally lie in lowered position as in Figs. 1 and 2 but may be swung upwardly for use as illustrated in Figs. 3 and 4.

If desired, pan 8 and its contents may be inverted and said pan loosened by water and removed from the frame and cubes. Then, the frame 9 and the contained cubes 12 may be placed under the spigot with the larger ends of said cubes upwardly. Running of water over the frame and the cubes will then melt the latter loose from the frame but they cannot drop from said frame for instance into the kitchen sink, due to the fact that the ends of the cubes then disposed upwardly, are of greater size than the ends of the cells 11 then disposed downwardly. However, if the frame 9 and the loosened cubes 12 be bodily re-inverted, said frame may be readily lifted from the cubes. In so re-inverting the frame and cubes, the pan 8 may be reapplied in an inverted position. Then, the pan, the frame and the cubes may be turned completely over and the frame 9 easily withdrawn as seen in Fig. 3, leaving the cubes 12 within the pan.

It will be seen from the foregoing that I make novel provision for quick and easy removal of the ice cubes, without materially increasing the cost of manufacturing the frame 9. The specific subject matter herein disclosed may be followed if desired, but within the scope of the invention as claimed, variations may be made.

I claim:—

1. An improvement in an ice cube-forming assembly embodying a shallow pan and a removable frame therein having partitions defining cube-forming cells open at both their upper and lower ends, said improvement consisting in said partitions being formed of gradually increasing thickness toward their upper edges to provide cells of larger size at their lower than at their upper ends.

2. A structure as specified in claim 1; together with handle means connected with the upper portion of said frame for use in withdrawing said frame from the ice cubes and pan.

3. An improvement in an ice cube-forming assembly embodying a shallow pan and removable frame therein having partitions defining cube-forming cells open at both their upper and lower ends, said improvement consisting in said partitions being formed of gradually increasing thickness toward one edge to provide cells of larger size at one end than at the other, together with a continuous side wall joined to the ends of said partitions and co-extensive in height therewith.

4. An ice moulding assembly comprising a pan, and a moulding frame upwardly removable therefrom, said frame having a moulding chamber open at both its upper and lower ends and gradually increased in size toward said lower end.

In testimony whereof I have hereunto affixed my signature.

HARRY WARDMAN.